(12) United States Patent
Wilcox et al.

(10) Patent No.: US 12,522,351 B1
(45) Date of Patent: Jan. 13, 2026

(54) PLANETARY PINION GEAR DEFLECTION RESTRAINT DEVICE

(71) Applicant: Textron Innovations Inc., Providence, RI (US)

(72) Inventors: Matthew Michael Wilcox, Fort Worth, TX (US); Eric S. Olson, Fort Worth, TX (US); Trenton Allen Hamm, Cleburne, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/038,331

(22) Filed: Jan. 27, 2025

(51) Int. Cl.
| | |
|---|---|
| *F16H 57/00* | (2012.01) |
| *B64C 27/32* | (2006.01) |
| *F16H 57/08* | (2006.01) |
| *B64C 27/00* | (2006.01) |

(52) U.S. Cl.
CPC .............. *B64C 27/32* (2013.01); *F16H 57/08* (2013.01); *B64C 27/006* (2013.01); *F16H 2057/0081* (2013.01)

(58) Field of Classification Search
CPC ............. F16H 57/08; F16H 2057/0081; B64C 27/006
See application file for complete search history.

(56) References Cited

U.S. PATENT DOCUMENTS

| | | | |
|---|---|---|---|
| 10,578,208 B2 * | 3/2020 | Woods | ...................... F16H 1/28 |
| 10,969,001 B2 * | 4/2021 | Ehinger | .................. F16H 55/08 |
| 11,703,117 B2 * | 7/2023 | Bianchi | ................. F16C 23/086 |
| | | | 475/348 |
| 12,007,010 B2 * | 6/2024 | Gräber | ...................... F02C 7/36 |

FOREIGN PATENT DOCUMENTS

EP 3412935 A2 12/2018

* cited by examiner

*Primary Examiner* — Sherry L Estremsky
(74) *Attorney, Agent, or Firm* — Akona IP PC

(57) ABSTRACT

One embodiment is a rotorcraft including a rotor system and a transmission system for providing rotational power to the rotor system, the transmission system comprising a housing and a planetary pinion gear disposed in the housing. The rotorcraft further includes a restraint assembly associated with the planetary pinion gear, the restraint assembly configured to restrict radial deflection of the planetary pinion gear during operation thereof subsequent to a crack-through failure of the planetary pinion gear.

19 Claims, 10 Drawing Sheets

PLANETARY PINION GEAR DEFLECTION RESTRAINT DEVICE

TECHNICAL FIELD

This disclosure relates in general to the field of aircraft and, more particularly, though not exclusively, to an apparatus for restraining deflection of a planetary pinion gear in such aircraft.

BACKGROUND

Various rotorcraft, such as helicopters, may include one or more rotor systems. One example of a rotorcraft rotor system is a main rotor system. A main rotor system may generate aerodynamic lift to support the weight of the rotorcraft in flight and thrust to counteract aerodynamic drag and move the aircraft in forward flight. Another example of a rotorcraft rotor system is a tail rotor system. A tail rotor system may provide anti-torque and/or directional control for the rotorcraft.

Critical damage to certain rotorcraft parts can result in catastrophic failure of the rotorcraft. One such rotorcraft part is a planetary pinion gear of a main rotor gearbox, failure of which can result in catastrophic loss of power delivery to the rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
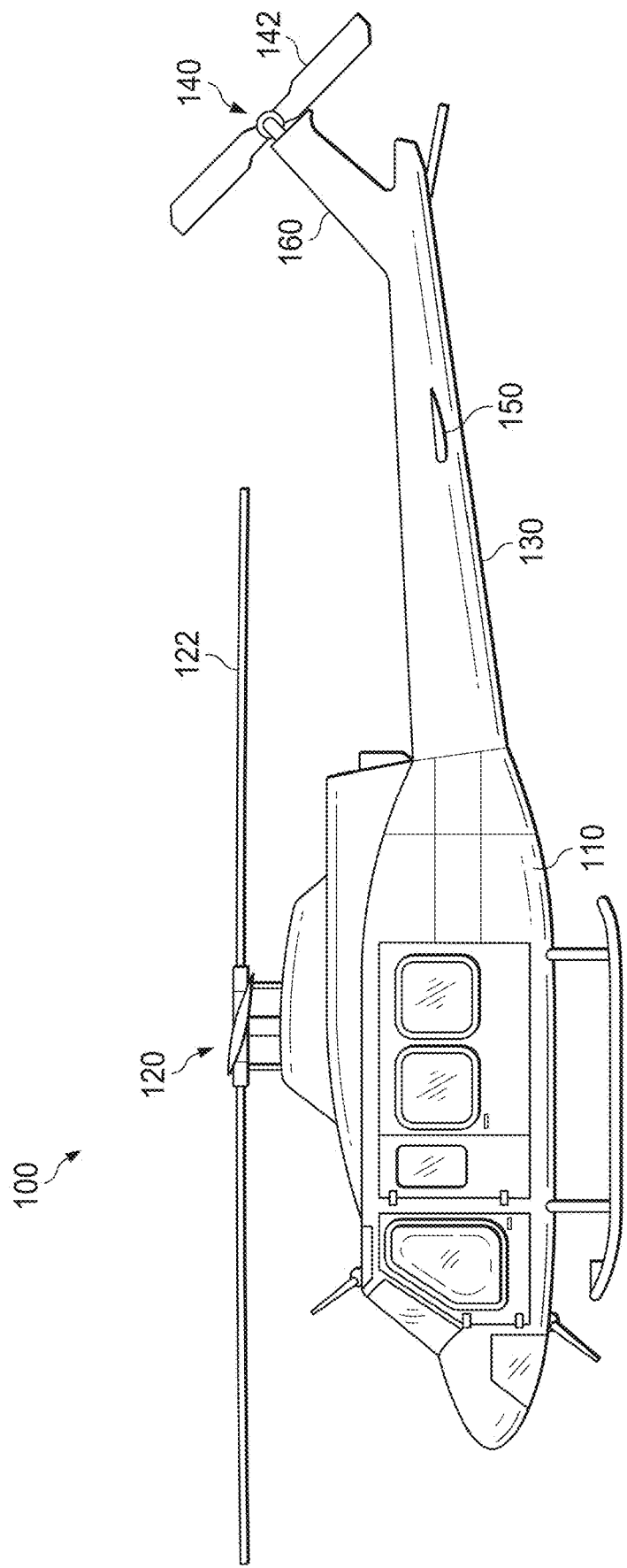
FIGS. 1 and 2 respectively illustrate a side plan view and a front plan view of an example rotorcraft in which embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 2:
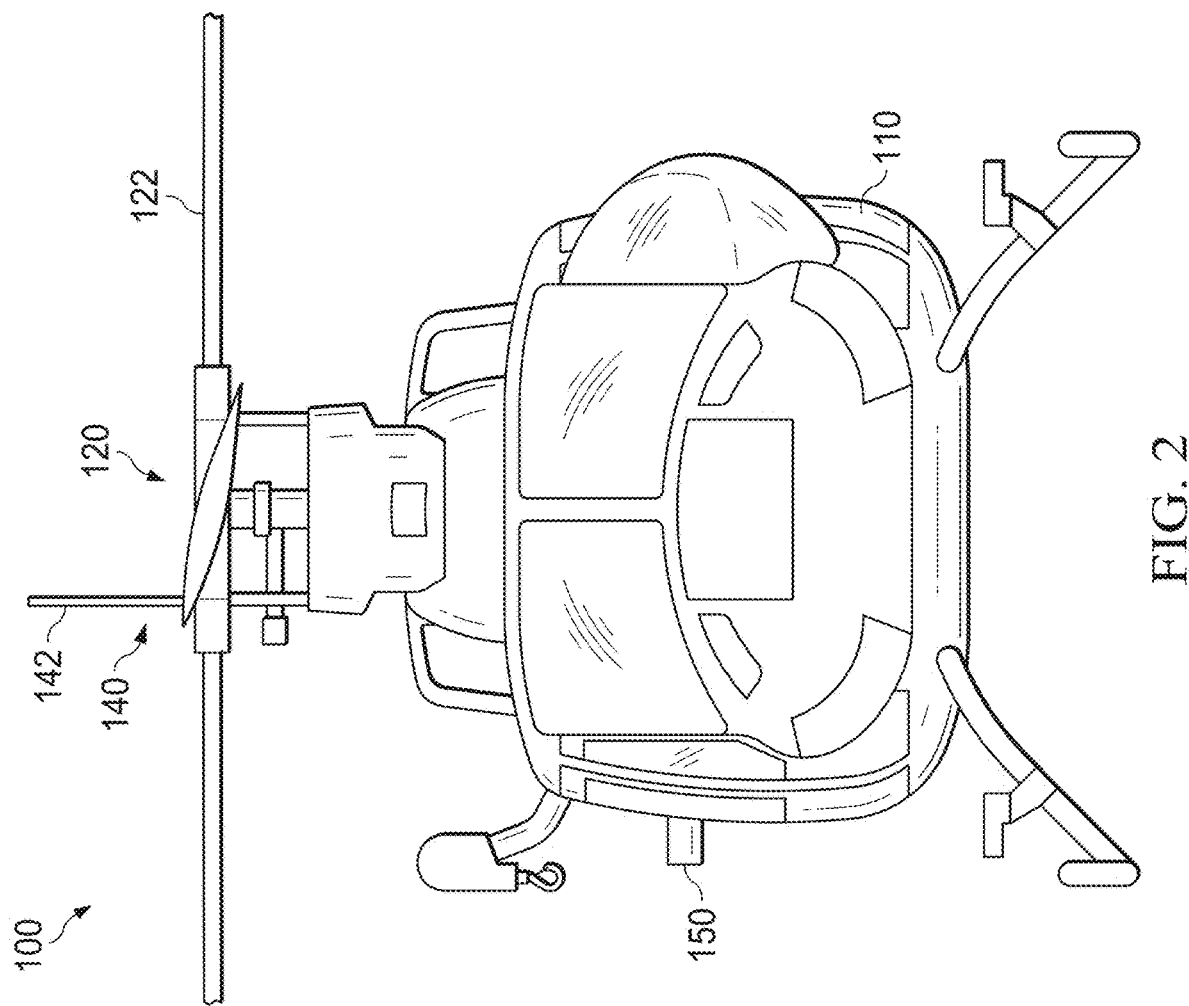

FIGS. 1 and 2 respectively illustrate side and front plan views of an example embodiment of a rotorcraft 100 in which embodiments described herein may be implemented. Rotorcraft 100 includes a fuselage 110, a rotor system (also alternatively referred to as a main rotor system) 120 comprising a plurality of rotating rotor blades 122, and an empennage 130. The fuselage 110 is the main body of the rotorcraft, which may include a cabin or cockpit for the crew, passengers, and/or cargo, and may also house certain mechanical and electrical components, such as one or more engines, transmission systems, and flight controls. The rotor system 120 is used to generate lift for the rotorcraft through rotation of rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control for the rotorcraft 100 using a plurality of rotating rotor blades 142. For example, torque generated by the engine(s) causes the rotor blades 142 to rotate, which in turn provides anti-torque and/or directional control. Blades 142 may provide thrust in the same direction as the rotation of blades 122 so as to counter the torque effect created by rotor system 120 and blades 122. Teachings of certain embodiments recognize that blades 142 may represent one example of a secondary rotor system. Other examples may include, but are not limited to, forward-thrust propellers (e.g., pusher propellers, tractor propellers, etc.), tail anti-torque propellers, ducted rotors, and ducted and mounted inside and/or outside the rotorcraft 100.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape and may also include one or more movable control surfaces. The primary purpose of a stabilizer is to improve stability about a particular axis (e.g., pitch or yaw stability), although a stabilizer can also provide other secondary aerodynamic benefits.

It should be appreciated that rotorcraft 100 shown in FIGS. 1 and 2 is merely illustrative of a variety of aircraft or other vehicles that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples. Additionally, while embodiments described herein are described with respect to aircraft, and particularly, rotorcraft, it will be appreciated that the teachings herein may be applied to parts of interest included in other types of vehicles and/or machines as may be deemed appropriate.

Teachings of certain embodiments relating to rotor systems described herein may apply to rotor system 120 and/or other rotor systems, such as tiltrotor and helicopter rotor systems. It should be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIGS. 1 and 2. For example, rotor system 120 may include components such as a power train, drive shafts, a hub, a swash plate, and pitch links.

In the example illustrated in FIGS. 1 and 2, power may be provided from the engines to main rotor blades 122 and tail rotor blades 142 through a combination of drive shafts, gearboxes (e.g., transmission systems or simply "transmissions") and other components. In some example embodiments, engines provide power through a main rotor gearbox to a rotating mast in mechanical communication with rotor blades 122. In addition, a drive shaft may provide power to a secondary rotor gearbox (e.g., a 90-degree gearbox), which may transit power to rotor blades 142. In these example embodiments, main rotor gearbox may be proximate the fuselage 110, secondary rotor gearbox may be proximate the empennage 130, and drive shaft may be proximate the fuselage and/or the empennage (e.g., extending from the main rotor gearbox to secondary rotor gearbox).

The components of rotor systems described herein may comprise any materials suitable for use with an aircraft rotor. For example, rotor blades and other components may comprise carbon fiber, fiberglass, or aluminum; and rotor masts and other components may comprise steel or titanium.

Figure 3:
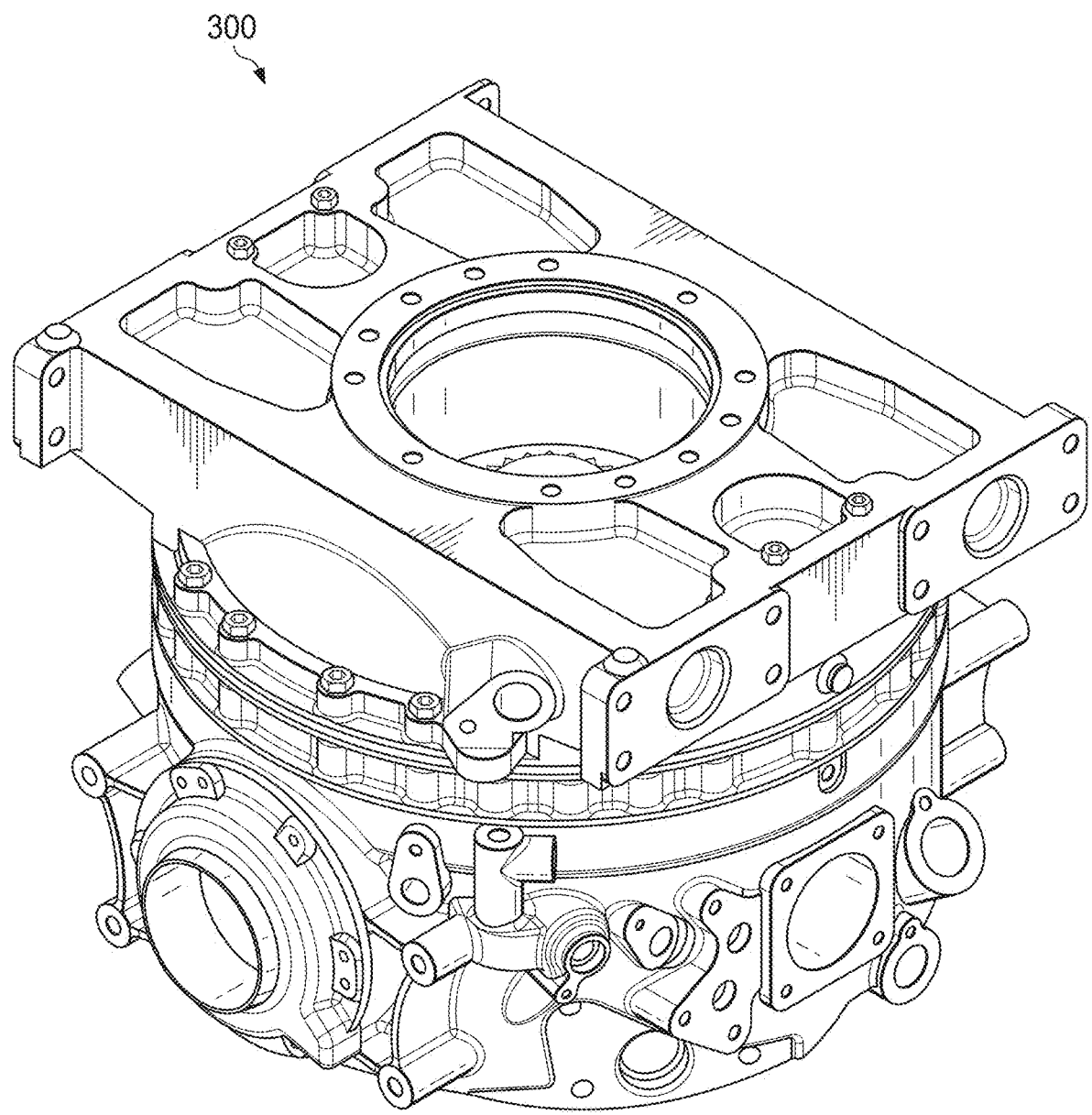
FIG. 3 is a perspective view of an example transmission that may be implemented in a drivetrain of the rotorcraft of FIGS. 1 and 2 in accordance with embodiments described herein.
Figure 4:
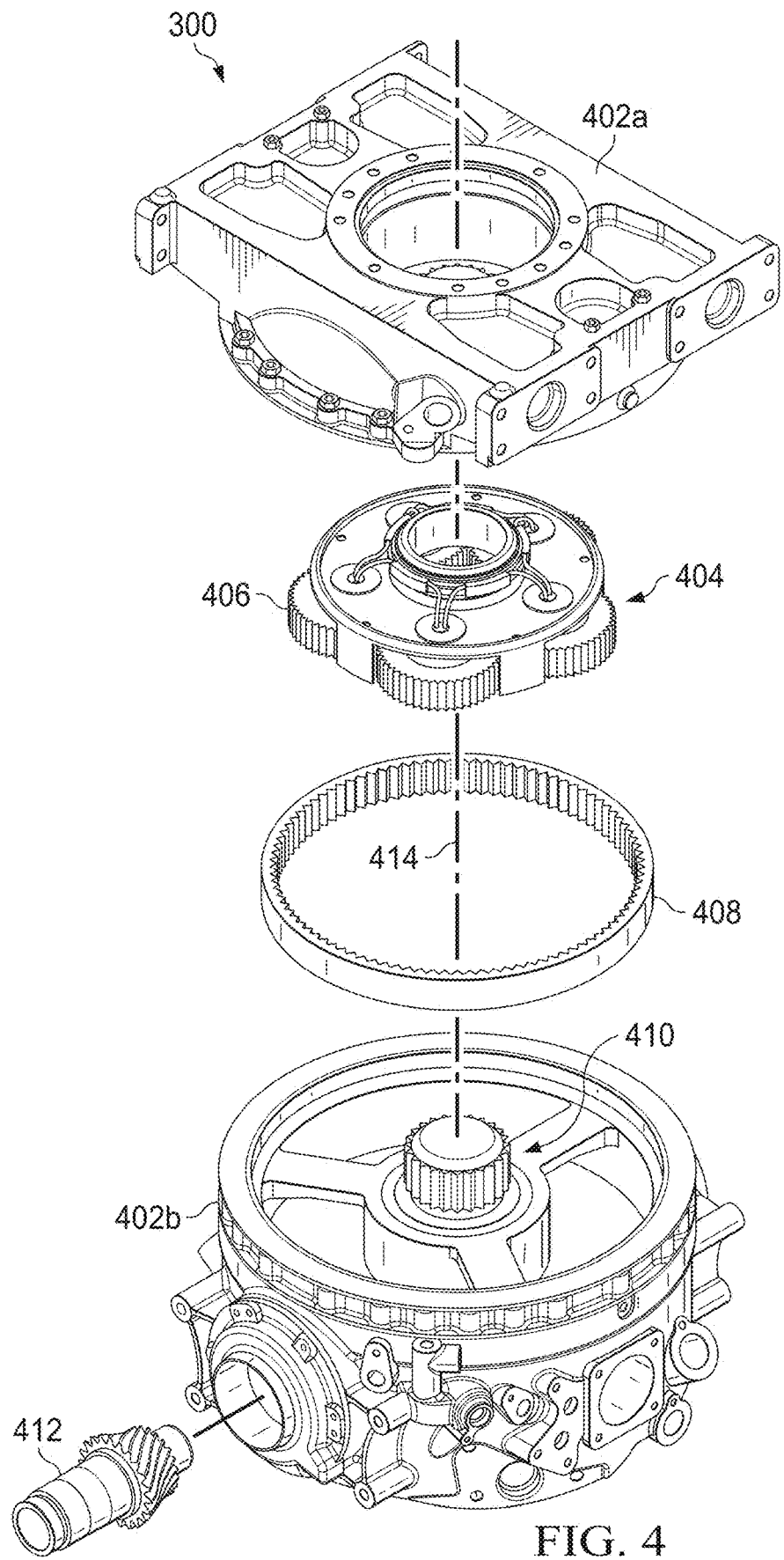
FIG. 4. is an exploded view of selected components of the example transmission of FIG. 3, including a planetary carrier assembly comprising an epicyclic gear system, in accordance with embodiments described herein.

FIG. 3 illustrates an isometric view of an example transmission 300 that may be used to implement one or more of the rotor systems of rotorcraft 100, such as main rotor system 120, for example. It will be recognized that while transmission 300 is a representative embodiment of a transmission that may be used to drive main rotor system 120, other styles and sized transmissions may also be used. FIG. 4 illustrates an exploded view of selected components within transmission 300. As shown in FIG. 4, transmission 300 includes an upper housing 402a and a lower housing 402b that couple together to form a single unitary housing configured to encompass internal components. Internal components may include at least a planetary carrier assembly 404 including an epicyclic gear system comprising planetary pinion gears 406, a planetary ring gear 408, and a planetary sun gear 410, and an input shaft 412. Although described with specific internal components, it is understood that transmission 300 may function with and utilize any number of selected components other than those depicted and described. For simplicity, other internal components within transmission 300 are not depicted. It is understood that different embodiments of transmission 300 may utilize a plurality of planetary carrier assemblies 404. Lower housing 402b, planetary ring gear 408, planetary carrier assembly 404 and upper housing 402a are each configured to accept main rotor mast (not shown in FIGS. 3 and 4) therethrough along a vertical axis 414. It is understood that vertical axis 414 is not limited in orientation to that of being vertical. Other orientations are possible depending on the type of aircraft and power train configuration. Input shaft 412 is a portion of drive linkage interconnecting an engine (not shown in FIGS. 3-4) and transmission 300.

Figure 5:
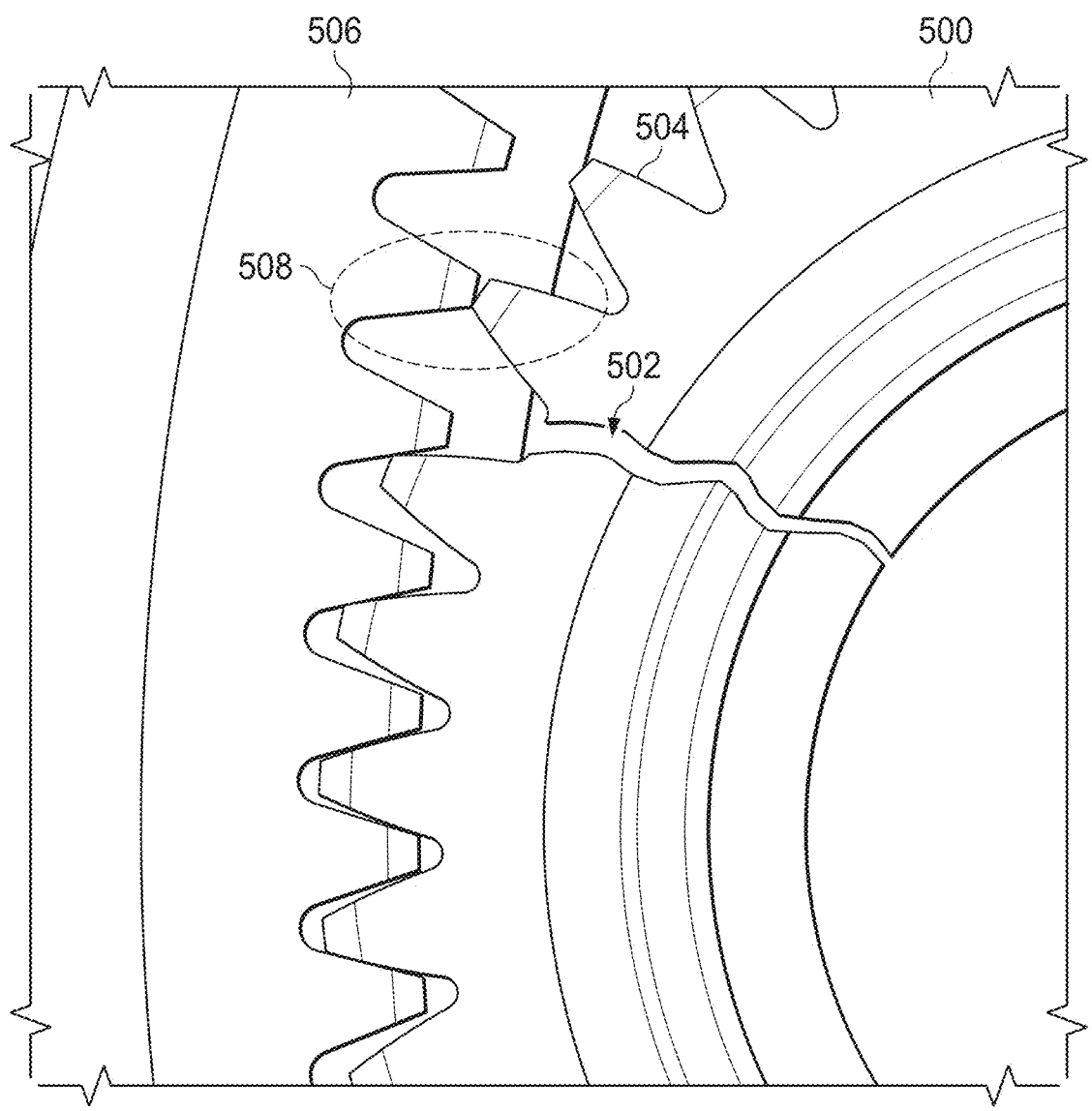
FIG. 5 illustrates a crack-through failure of a planetary pinion gear in accordance with embodiments described herein.

As previously noted, failure of a planetary pinion gear in a main rotor gearbox of a rotorcraft can lead to catastrophic loss of power delivery to the rotorcraft. As illustrated in FIG. 5, once a planetary pinion gear 500 experiences a crack-through failure, designated by a reference numeral 502, the gear opens circumferentially due to centrifugal force. Resulting deflection of the planetary pinion gear 500 results in teeth 504 of the gear misaligning and clashing with those of sun gear (e.g., sun gear 410 (FIG. 4)) and/or ring gear 506, as highlighted in an area designated by a reference numeral 508, resulting in catastrophic failure to the rotorcraft.

In accordance with features of embodiments described herein, an assembly may be provided in connection with a planetary pinion gear for restraining the gear from excessive radial/circumferential deflection upon a failure thereof due to a crack-through failure thereof. Embodiments of restraint assemblies described herein may also impede/prevent axial displacement of the gear.

Figure 6A:
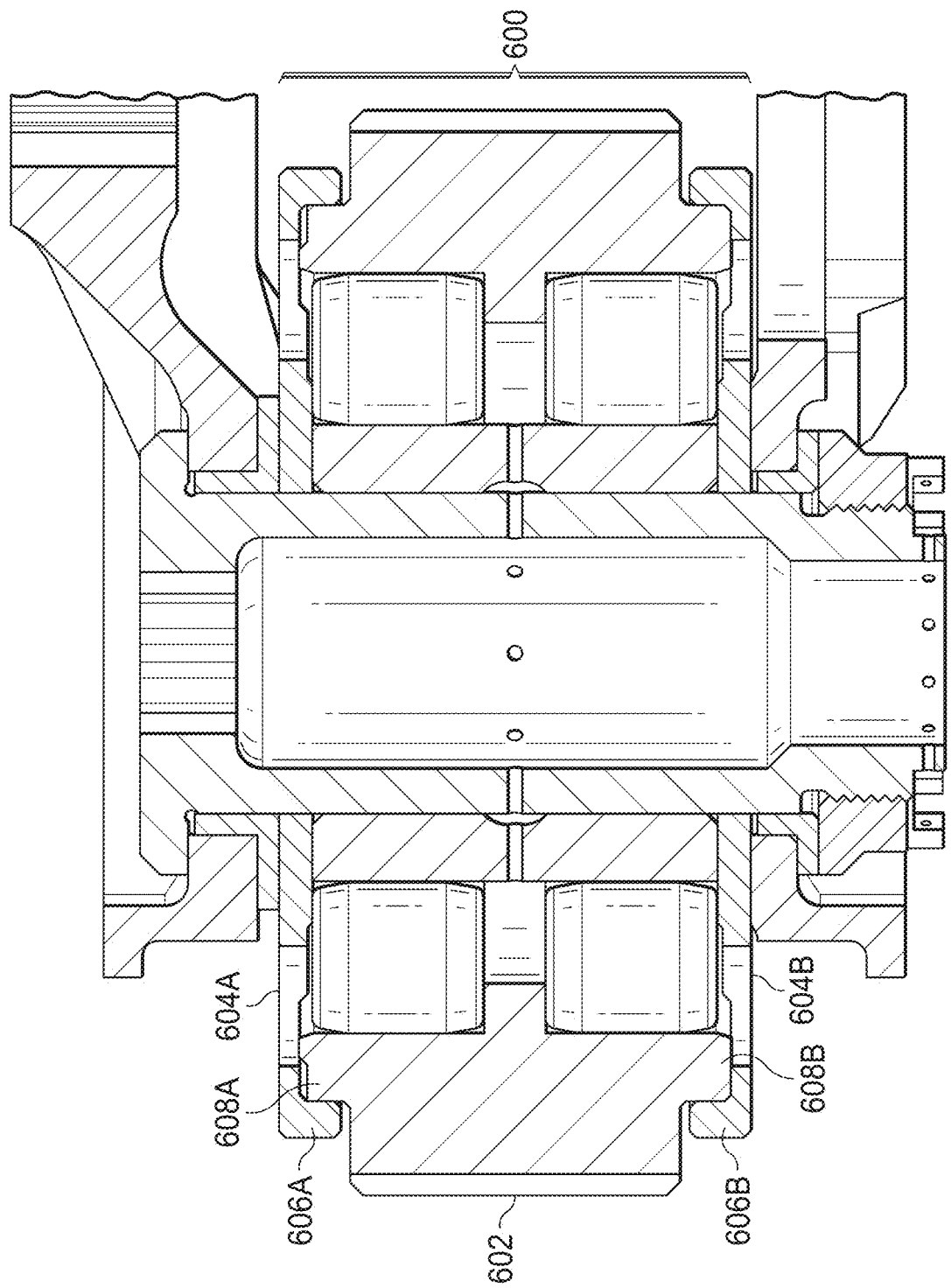
FIGS. 6A and 6B illustrate an example restraint assembly for a planetary pinion gear in accordance with embodiments described herein.
Figure 6B:
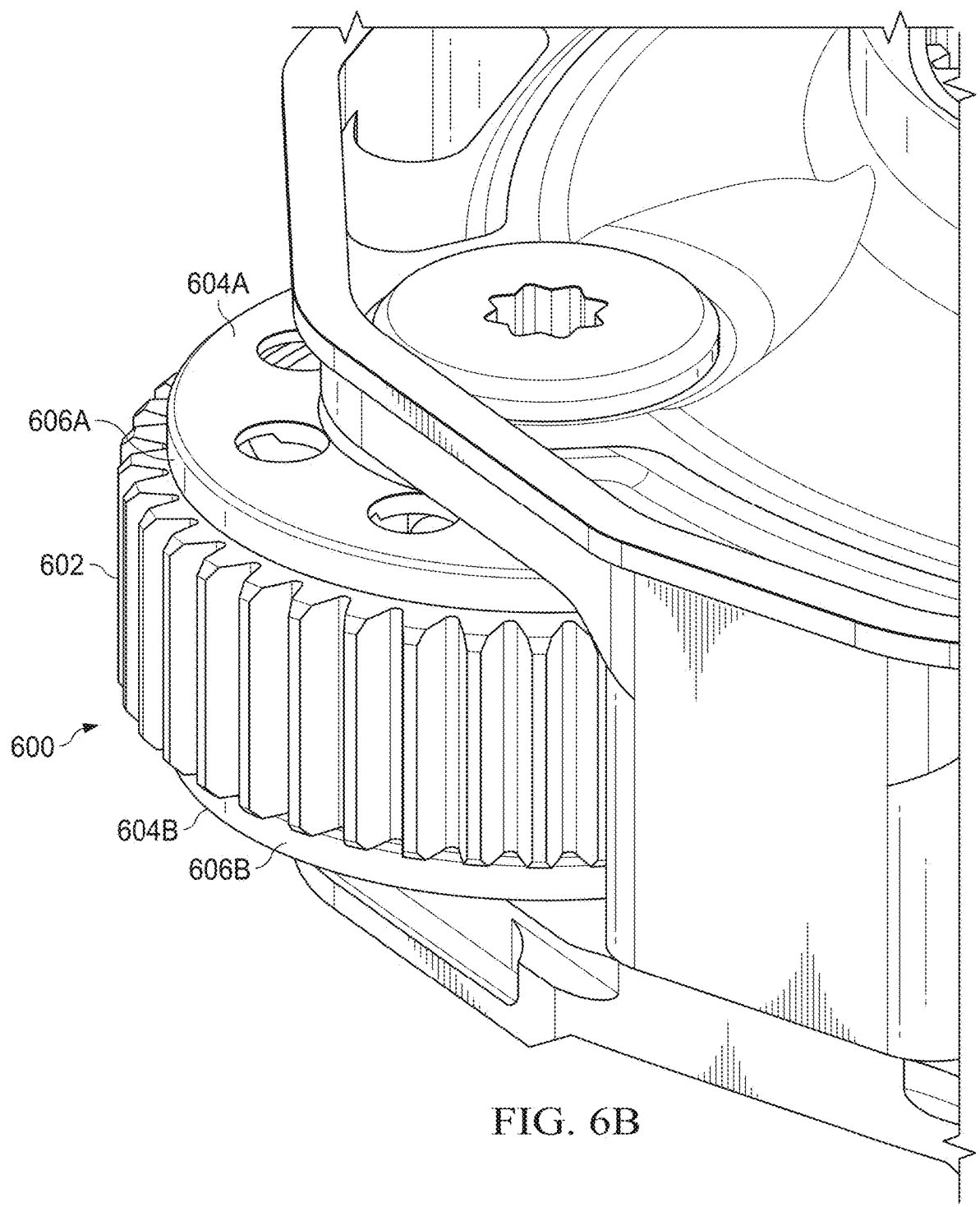

Referring to FIGS. 6A and 6B, a restraint assembly 600 for a planetary pinion gear 602, may include a pair of washers including an upper washer 604A disposed over a top of gear 602 and a lower washer 604B disposed under a bottom of gear 602. Washer 604A includes a flange 606A around an outer circumference of a bottom surface thereof.

Flange 606A surrounds a flange 608A proximate an outer circumference of a top surface of gear 602 such that an inner surface of flange 606A faces an outer surface of flange 608A. Washer 604B includes a flange 606B around an outer circumference of a top surface thereof. Flange 606B surrounds a flange 608B proximate an outer circumference of a bottom surface of gear 602 such that an inner surface of flange 606A faces an outer surface of flange 608A.

In particular embodiments, a minute gap is provided between inner surfaces of flanges 606A, 606B, and outer surfaces of flanges 608A, 608B, respectively, so that during normal operation, the flanges 606A/608A and 606B/608B do not come into contact with one another as gear 602 spins. In the event of a crack-through failure of the planetary pinion gear 602 (as illustrated in FIG. 5), inner surfaces of flanges 606A, 606B, engage with outer surfaces of flanges 608A, 608B, respectively, to restrain radial deflection of planetary pinion gear 602.

Figure 7A:
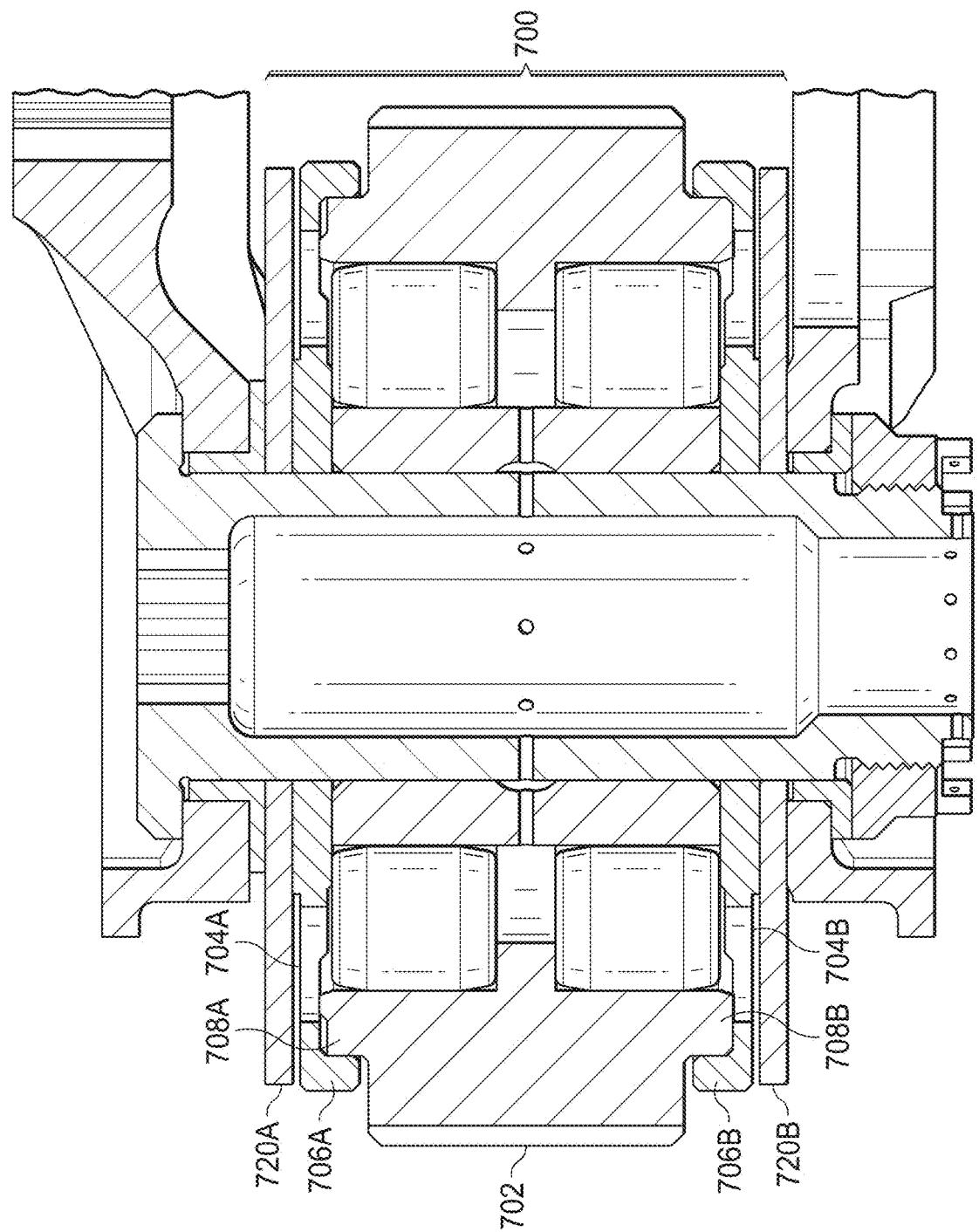
FIGS. 7A and 7B illustrate an example alternative restraint assembly for a planetary pinion gear in accordance with embodiments described herein.
Figure 7B:
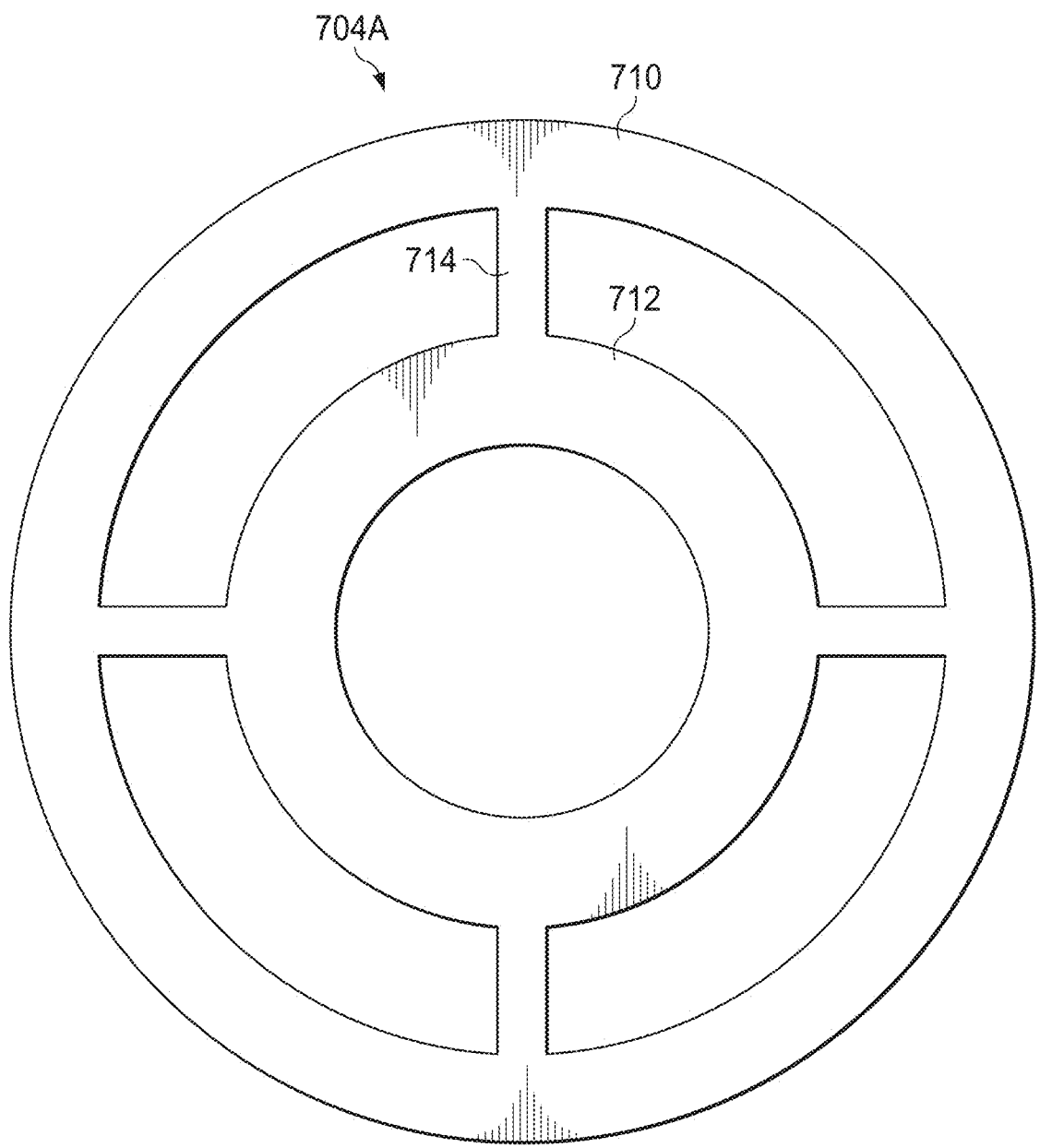

FIGS. 7A and 7B illustrate an alternative example embodiment of restraint assembly 700 for a planetary pinion gear. As shown in FIGS. 7A, restraint assembly 700 is similar to restraint assembly 600 and may include a pair of washers including an upper washer 704A disposed over a top of gear 702 and a lower washer 704B disposed under a bottom of gear 702. Washer 704A includes a flange 706A around an outer circumference of a bottom surface thereof. Flange 706A surrounds a flange 708A proximate an outer circumference of a top surface of gear 702 such that an inner surface of flange 706A faces an outer surface of flange 708A. Washer 704B includes a flange 706B around an outer circumference of a top surface thereof. Flange 706B surrounds a flange 708B proximate an outer circumference of a bottom surface of gear 702 such that an inner surface of flange 706A faces an outer surface of flange 708A.

In particular embodiments, a minute gap is provided between inner surfaces of flanges 706A, 706B, and outer surfaces of flanges 708A, 708B, respectively, so that during normal operation, the flanges 706A/708A and 606B/608B do not come into contact with one another as gear 702 spins.

Referring now to FIG. 7B, in a particular embodiment, washer 704 (which is representative of both washers 704A and 704B) may include an outer ring 710 and an inner ring 712 connected by one or more connector portions 714. In the event of a crack-through failure of the planetary pinion gear 702 (as illustrated in FIG. 5), inner surfaces of flanges 706A, 706B, engage with outer surfaces of flanges 708A, 708B, respectively, to restrain radial deflection of planetary pinion gear 702. Moreover, connector portions 714 that are designed to fracture in response to a crack-through failure of gear 702 such that outer ring 710 continues to spin with, and arrest radial growth of, gear 702. Referring again to FIG. 7A, a second pair of washers 720A, 720B, may be provided over washer 704A and under washer 704B, respectively, for inhibiting and/or preventing axial movement of washers 704A, 704B, and gear 702 after washers 704A, 704B, after they fracture in response to a crack-through failure of gear 702.

In particular embodiments, washers 604A, 604B, 704A, 704B, 720A, and 720B, are constructed of metal coated with a high lubricity coating (e.g., silver plate or bronze) to limit heat generation and deterioration of washers.

Figure 8:
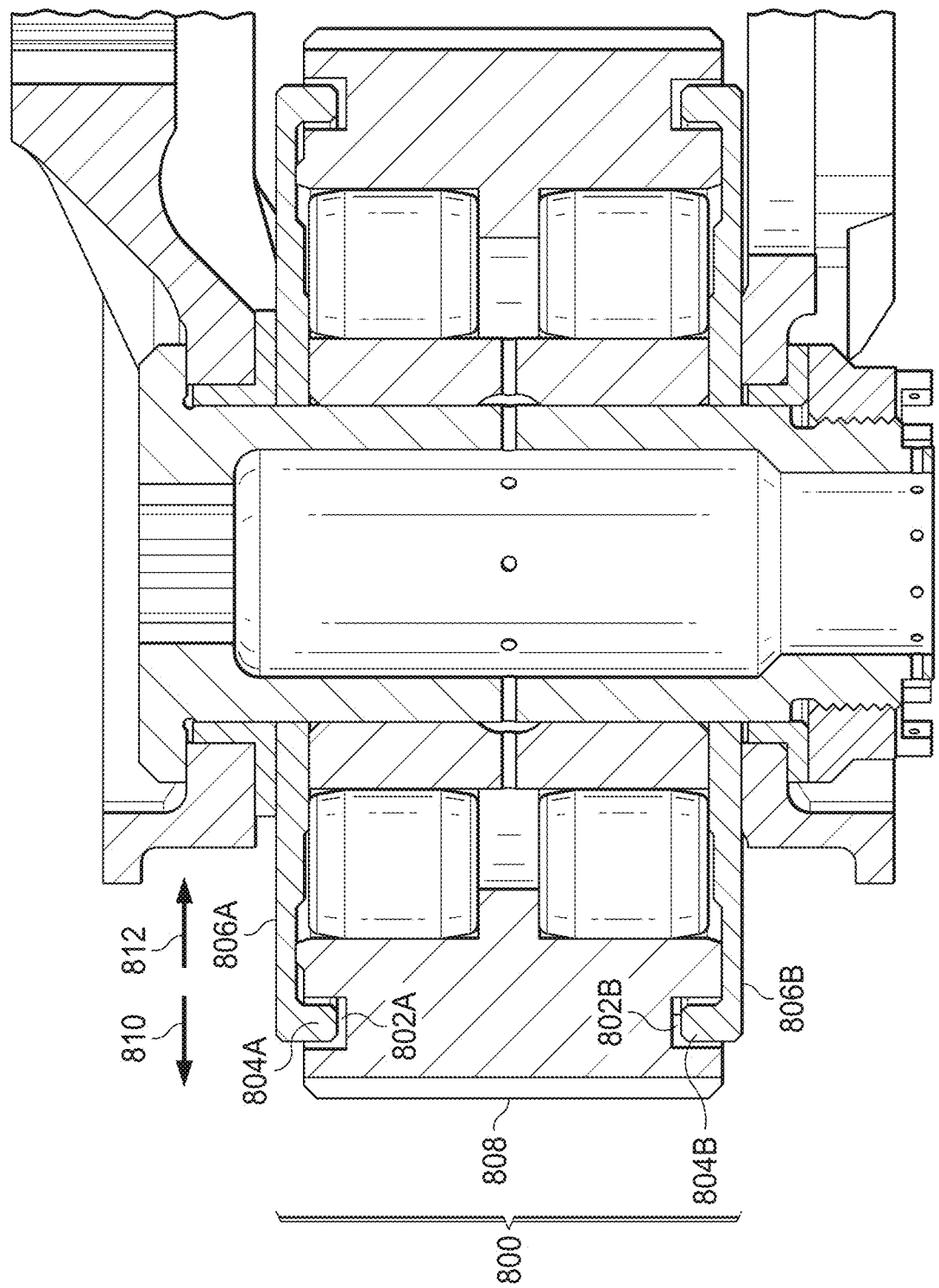
FIG. 8 illustrates another example alternative restraint assembly for a planetary pinion gear in accordance with embodiments described herein.

Referring now to FIG. 8, in another alternative embodiment of a restraint assembly, designated in FIG. 8 by a reference numeral 800, any or all of flanges 608A, 608B, 708A, 708B, may be replaced with channels 802A, 802B, for receiving washer flanges 606A, 606B, 706A, 706B, (represented in FIG. 8 by washer flanges 804A, 804B), respectively. The configuration shown in FIG. 8 enables washers 806A, 806B, to inhibit both radial expansion of a gear 808 in a direction 810 and radial contraction of gear 808 in a direction 812. Additionally, washers of restraint assembly configurations shown in FIGS. 6, 7A-B, and 8 may prevent and/or inhibit axial, as well as radial, displacement of the corresponding gear.

Provision of planetary pinion gears with restraint assemblies such as restraint assemblies 600, 700, 800, may provide additional time for crew to land the rotorcraft safely following planetary pinion gear crack-through failure. Additionally, assemblies 600, 700, 800, require minimal modification to components already on the rotorcraft, thereby resulting in a negligible weight increase. Additionally, hard contact between the parts of assemblies and corresponding planetary pinion gears only occurs after a crack-through failure of the planetary pinion gear.

Example 1 provides a rotorcraft including a rotor system; and a transmission system for providing rotational power to the rotor system, the transmission system including a housing; and a planetary pinion gear disposed in the housing; and a restraint assembly associated with the planetary pinion gear, the restraint assembly configured to restrict radial deflection of the planetary pinion gear during operation thereof subsequent to a crack-through failure of the planetary pinion gear.

Example 2 provides the rotorcraft of example 1, in which the restraint assembly includes at least one washer including a flange around a circumference thereof, in which an inner surface of the flange engages an outer circumferential edge of the planetary pinion gear subsequent to the crack-through failure of the planetary pinion gear.

Example 3 provides the rotorcraft of example 2, in which the outer circumferential edge of the planetary pinion gear includes a channel for receiving the flange.

Example 4 provides the rotorcraft of any one of examples 1-3, in which the restraint assembly includes a pair of washers each including a flange around a circumference thereof, in which a first one of the washers is disposed over a top surface of the planetary pinion gear and a second one of the washers is disposed under a bottom surface of the planetary pinion gear.

Example 5 provides the rotorcraft of example 4, in which an inner surface of the flange of the first one of the washers engages an outer circumferential edge of a top of the planetary pinion gear subsequent to the crack-through failure of the planetary pinion gear and in which an inner surface of the flange of the second one of the washers engages an outer circumferential edge of a bottom of the planetary pinion gear subsequent to the crack-through failure of the planetary pinion gear.

Example 6 provides the rotorcraft of any one of examples 1-5, in which the restraint assembly includes a first washer and a second washer between the first washer and a surface of the planetary pinion gear.

Example 7 provides the rotorcraft of example 6, in which the first washer limits axial movement of the second washer subsequent to the crack-through failure of the planetary pinion gear.

Example 8 provides the rotorcraft of example 7, in which the first washer includes an outer ring and an inner ring connected to the outer ring via at least one connection member.

Example 9 provides the rotorcraft of example 8, in which the first washer is configured such that the crack-through failure of the planetary pinion gear causes the at least one connection member to break, such that the inner and outer rings rotate independently.

Example 10 provides a restraint assembly configured to restrict radial deflection of a planetary pinion gear during operation thereof subsequent to a crack-through failure of the planetary pinion gear, the restraint assembly including at least one washer including a flange around a circumference thereof, in which an inner surface of the flange engages an outer circumferential edge of the planetary pinion gear subsequent to the crack-through failure of the planetary pinion gear.

Example 11 provides the restraint assembly of example 10, in which the outer circumferential edge of the planetary pinion gear includes a channel for receiving the flange.

Example 12 provides the restraint assembly of example 10 or 11, in which the at least one washer includes a pair of washers each including a flange around a circumference thereof, in which a first one of the washers is disposed over a top surface of the planetary pinion gear and a second one of the washers is disposed under a bottom surface of the planetary pinion gear.

Example 13 provides the restraint assembly of example 12, in which an inner surface of the flange of the first one of the washers engages an outer circumferential edge of a top of the planetary pinion gear subsequent to the crack-through failure of the planetary pinion gear and in which an inner surface of the flange of the second one of the washers engages an outer circumferential edge of a bottom of the planetary pinion gear subsequent to the crack-through failure of the planetary pinion gear.

Example 14 provides the restraint assembly of any one of examples 10-13, in which the at least one washer includes a first washer, the restraint assembly further including a second washer positioned such that the first washer is between the second washer and a surface of the planetary pinion gear.

Example 15 provides the restraint assembly of example 14, in which the second washer limits axial movement of the first washer subsequent to the crack-through failure of the planetary pinion gear.

Example 16 provides the restraint assembly of example 15, in which the second washer includes an outer ring and an inner ring connected to the outer ring via at least one connection member.

Example 17 provides the restraint assembly of example 16, in which the second washer is configured such that the crack-through failure of the planetary pinion gear causes the at least one connection member to break, such that the inner and outer rings rotate independently.

Example 18 provides a restraint assembly configured to inhibit at least one of radial and axial deflection of a planetary pinion gear during operation thereof subsequent to a crack-through failure of the planetary pinion gear, in which the planetary pinion gear includes top and bottom surfaces each including a channel disposed therein around a circumference thereof, the restraint assembly including a first washer disposed over the top surface of the planetary pinion gear and including a flange along a circumference of the first washer; and a second washer disposed under the bottom surface of the planetary pinion gear and including a flange along a circumference the second washer; in which the flange of the first washer is received in the channel disposed in the top surface of the planetary pinion gear and the flange of the second washer is received in the channel disposed in the bottom surface of the planetary pinion gear; and in which during normal operation, surfaces of the flanges do not contact surfaces of the channels.

Example 19 provides the restraint assembly of example 18, in which inner surfaces of the flanges engage inner surfaces of the channels subsequent to a crack-through failure of the planetary pinion gear to inhibit radial expansion of the planetary pinion gear.

Example 20 provides the restraint assembly of example 18 or 19, in which outer surfaces of the flanges engage outer surfaces of the channels subsequent to a crack-through failure of the planetary pinion gear to inhibit radial contraction of the planetary pinion gear.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotorcraft comprising:
a rotor system; and
a transmission system for providing rotational power to the rotor system, the transmission system comprising:
a housing; and
a planetary pinion gear disposed in the housing; and
a restraint assembly associated with the planetary pinion gear, the restraint assembly configured to restrict radial deflection of the planetary pinion gear during operation thereof subsequent to a crack-through failure of the planetary pinion gear;
wherein the restraint assembly comprises at least one washer including a flange around a circumference thereof, wherein an inner surface of the flange engages an outer circumferential edge of the planetary pinion gear subsequent to the crack-through failure of the planetary pinion gear.

2. The rotorcraft of claim 1, wherein the outer circumferential edge of the planetary pinion gear comprises a channel for receiving the flange.

3. The rotorcraft of claim 1, wherein the at least one washer comprises a pair of washers each including a flange around a circumference thereof, wherein a first one of the washers is disposed over a top surface of the planetary pinion gear and a second one of the washers is disposed under a bottom surface of the planetary pinion gear.

4. The rotorcraft of claim 3, wherein an inner surface of the flange of the first one of the washers engages an outer circumferential edge of a top of the planetary pinion gear subsequent to the crack-through failure of the planetary pinion gear and wherein an inner surface of the flange of the second one of the washers engages an outer circumferential edge of a bottom of the planetary pinion gear subsequent to the crack-through failure of the planetary pinion gear.

5. The rotorcraft of claim 1, wherein the at least one washer comprises a first washer and a second washer between the first washer and a surface of the planetary pinion gear.

6. The rotorcraft of claim 5, wherein the first washer limits axial movement of the second washer subsequent to the crack-through failure of the planetary pinion gear.

7. The rotorcraft of claim 6, wherein the second washer comprises an outer ring and an inner ring connected to the outer ring via at least one connection member.

8. The rotorcraft of claim 7, wherein the second washer is configured such that the crack-through failure of the planetary pinion gear causes the at least one connection member to break, such that the inner and outer rings rotate independently.

9. A restraint assembly configured to restrict radial deflection of a planetary pinion gear during operation thereof subsequent to a crack-through failure of the planetary pinion gear, the restraint assembly comprising at least one washer including a flange around a circumference thereof, wherein an inner surface of the flange engages an outer circumferential edge of the planetary pinion gear subsequent to the crack-through failure of the planetary pinion gear.

10. The restraint assembly of claim 9, wherein the outer circumferential edge of the planetary pinion gear comprises a channel for receiving the flange.

11. The restraint assembly of claim 9, wherein the at least one washer comprises a pair of washers each including a flange around a circumference thereof, wherein a first one of the washers is disposed over a top surface of the planetary pinion gear and a second one of the washers is disposed under a bottom surface of the planetary pinion gear.

12. The restraint assembly of claim 11, wherein an inner surface of the flange of the first one of the washers engages an outer circumferential edge of a top of the planetary pinion gear subsequent to the crack-through failure of the planetary pinion gear and wherein an inner surface of the flange of the second one of the washers engages an outer circumferential edge of a bottom of the planetary pinion gear subsequent to the crack-through failure of the planetary pinion gear.

13. The restraint assembly of claim 9, wherein the at least one washer comprises a first washer, the restraint assembly further comprising a second washer positioned such that the first washer is between the second washer and a surface of the planetary pinion gear.

14. The restraint assembly of claim 13, wherein the second washer limits axial movement of the first washer subsequent to the crack-through failure of the planetary pinion gear.

15. The restraint assembly of claim 14, wherein the first washer comprises an outer ring and an inner ring connected to the outer ring via at least one connection member.

16. The restraint assembly of claim 15, wherein the first washer is configured such that the crack-through failure of the planetary pinion gear causes the at least one connection member to break, such that the inner and outer rings rotate independently.

17. A restraint assembly configured to inhibit at least one of radial and axial deflection of a planetary pinion gear during operation thereof subsequent to a crack-through failure of the planetary pinion gear, wherein the planetary pinion gear comprises top and bottom surfaces each including a channel disposed therein around a circumference thereof, the restraint assembly comprising:
  a first washer disposed over the top surface of the planetary pinion gear and comprising a flange along a circumference of the first washer; and
  a second washer disposed under the bottom surface of the planetary pinion gear and comprising a flange along a circumference the second washer;
  wherein the flange of the first washer is received in the channel disposed in the top surface of the planetary pinion gear and the flange of the second washer is received in the channel disposed in the bottom surface of the planetary pinion gear; and
  wherein during normal operation, surfaces of the flanges do not contact surfaces of the channels.

18. The restraint assembly of claim 17, wherein inner surfaces of the flanges engage inner surfaces of the channels subsequent to a crack-through failure of the planetary pinion gear to inhibit radial expansion of the planetary pinion gear.

19. The restraint assembly of claim 17, wherein outer surfaces of the flanges engage outer surfaces of the channels subsequent to a crack-through failure of the planetary pinion gear to inhibit radial contraction of the planetary pinion gear.

* * * * *